United States Patent [19]

Heinle

[11] 4,381,555
[45] Apr. 26, 1983

[54] APPARATUS FOR MEASURING THE BRAKING TIME OF A MOTOR VEHICLE

[75] Inventor: Karl-W. Heinle, Ingolstadt, Fed. Rep. of Germany

[73] Assignee: Audi NSU Auto Union Aktiengesellschaft, Neckarsulm, Fed. Rep. of Germany

[21] Appl. No.: 138,746

[22] Filed: Apr. 9, 1980

[30] Foreign Application Priority Data

Apr. 10, 1979 [DE] Fed. Rep. of Germany ....... 2914411

[51] Int. Cl.³ ............................................. G11C 13/00
[52] U.S. Cl. ..................... 365/78; 365/244;
346/33 EC; 364/569; 368/6; 377/19
[58] Field of Search ................. 365/78, 129, 154, 244;
340/347 AD; 346/33 EC, 44; 235/92 SH

[56] References Cited

U.S. PATENT DOCUMENTS 2,787,418 4/1957 MacKnight ................. 340/347 AD

FOREIGN PATENT DOCUMENTS 2322299 11/1973 Fed. Rep. of Germany ........ 365/78
2333970 1/1974 Fed. Rep. of Germany ........ 365/78

Primary Examiner—Terrell W. Fears
Attorney, Agent, or Firm—Gerald L. Lett

[57] ABSTRACT

Apparatus is described for recording certain operating conditions of a motor vehicle, those conditions occurring upon the braking of the vehicle, and the apparatus is particularly applicable to vehicles equipped with antilock braking systems. A shift register is controlled by an oscillator in continuously shifting operation. When a predetermined driving condition occurs, the state of the first register location is changed. In the event the device is used for recording a braking condition, there is provided a time delay switch which locks the shift register at the point it has reached when a predetermined delay time is exceeded. The aforementioned shift register can be constructed in the form of an electromechanical shift register which responds to a signal generated through the operation of a stop lamp switch.

8 Claims, 3 Drawing Figures

APPARATUS FOR MEASURING THE BRAKING TIME OF A MOTOR VEHICLE

BACKGROUND OF THE INVENTION

This invention relates to apparatus for recording operating conditions of a motor vehicle for later analysis, and is particularly directed to apparatus of the type capable of recording braking conditions. The invention is particularly applicable to vehicles equipped with antilock braking systems.

The construction and operation of antilock braking systems are well known in the art, and one of their operating characteristics is that, in the event of an accident, it is generally not possible to examine the vehicle or the accident scene to determine whether the brakes had been applied immediately prior to the accident. This becomes an important consideration when it is necessary to make a determination of fault in causing the accident.

Just as in the case of the well-known flight recorders present on aircraft, there are available so-called drive recorders for automobiles which, for example, log the driver's movements, as well as those of the vehicle prior to and during an accident. Sensors of a wide variety of types can be mounted at varying locations in the vehicle and using a data logger the drive recorder apparatus logs, for example, the last 25 seconds of the driving event prior to a sudden external impact.

In order to record the kinds of conditions which would indicate when brake application occurred prior to impact or the like, a drive recorder, such as that described hereinabove, could be used on a vehicle. However, the use of relatively complex and sensitive instrumentation of this type is highly disadvantageous when the difficulties it must undergo during routine operation are remembered. Such a device must be capable of operating reliably during the entire life of the vehicle, often under extreme operating conditions including extreme heat and cold, as well as strong impact acceleration or deceleration. It is unlikely that any such device will be maintained regularly during the operating life of the vehicle. Especially in view of the latter condition, it is unlikely that reliable storage of data can occur in the event of an accident. These difficulties might be overcome, but they can be overcome only with the use of relatively complex instrumentation constructed at relatively great cost.

It is, therefore, an object of this invention to provide apparatus which is of simple construction and with which the operating conditions of a motor vehicle, particularly the braking conditions, can be recorded with a high degree of reliability.

It is another object of this invention to provide apparatus which meets the foregoing object and which will provide an indication of braking conditions even on those vehicles equipped with antilock braking systems.

SUMMARY OF THE INVENTION

The foregoing and other objects are achieved in an apparatus for measuring operating conditions of a motor vehicle constructed in accordance with the principles of the invention.

A register is employed which continuously registers a given binary bit and this bit is shifted from location to location in the register under the control of an oscillator during a normal driving operations. However, when, for example, the brake is actuated, the state of the binary bit being registered changes, and the number of locations through which that changed bit has progressed in the shift register provides an indication of the time between brake application and, for example, impact.

In a further alternative embodiment, the foregoing operations are carried out electromechanically.

BRIEF DESCRIPTION OF THE DRAWINGS

The principles of the invention will be more readily understood by reference to the description of alternative preferred embodiments given hereinbelow in conjunction with the drawings which are briefly described in the following.

DESCRIPTION OF THE PREFERRED EMBODIMENTS

Figure 1:
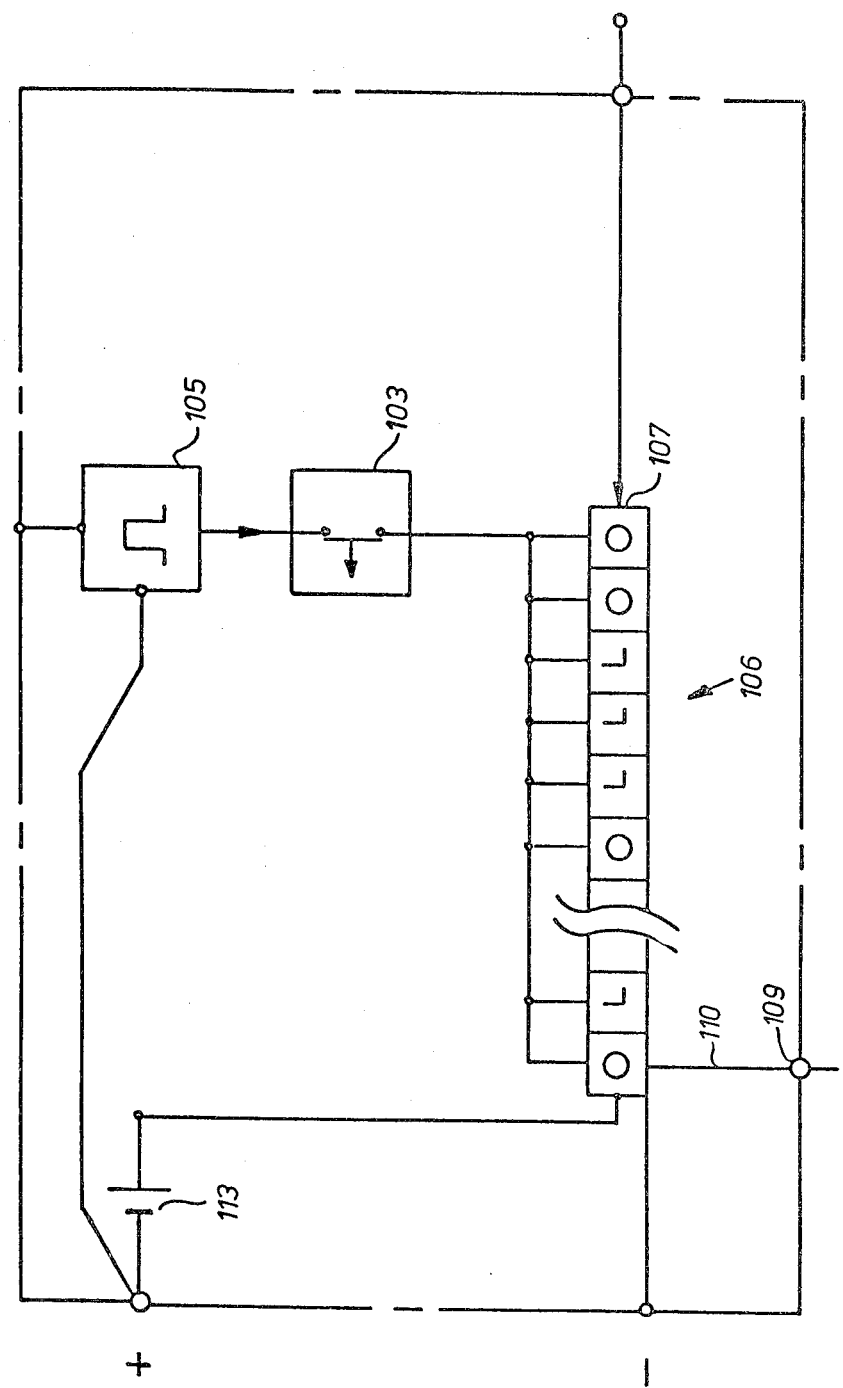
FIG. 1 is a schematic diagram of a first preferred embodiment constructed and operating according to the principles of the invention.

Referring to FIG. 1, there is shown in schematic form a first arrangement by which the principles of the invention can be carried out.

In this embodiment, an electronic shift register 106 of conventional construction has an input to its first digit location connected to a normally closed acceleration switch 103. This switch, when closed, connects the shift register to the output of an oscillator 105. Thus, with each pulse occurrence, a digit present in, for example, the first digit location will be shifted to the next succeeding location and so on. The binary state of the digit in the first location is controlled by an input 107. This input is connected, for example, to a stop light switch (not shown). The shift register is interrogated for its contents via an interrogation line 110 which is made available for output at point 109. Power for the shift register is supplied from the battery 113.

In operation, shift register 106 receives shift pulses through switch 103 from oscillator 105. With each incoming shift pulse, the existing binary state of, for example, the first digit location in the shift register is shifted one position, in this case relative to the drawing, to the left, and each of the contents of the succeeding locations are shifted accordingly. If a voltage should be present at input 107 from, in this case, the stoplight switch, the binary state of the contents of the first digit location in the shift register will be changed. For example, the normal binary state is zero, and the presence of a voltage at input 107 will change that to a one state. With the continued presence of a voltage at input 107 and the continued supply of pulses to the shift input of the shift register, there will be a series of contiguous one values in a given register location group. The length of this group is a measure of the time during which a voltage from the stoplight switch is supplied and is thereby a measure of the time the brakes were applied.

Should the brakes be applied and released, a group of one bits, so produced, are shifted through the shift register and ultimately received at interrogation point 109. If the brakes are simply released following application, a group of bits having a corresponding length will be formed, and this group of bits will be a measure of the time of brake application.

If the braking action actually occurs before an impact which produces a given deceleration, normally closed acceleration switch 103 will be opened. The length of the group of one bits measured will then be those which are actually received at interrogation point 109 prior to deactivation of the shift register. This value might be a measure of the braking time prior to an impact. The speed of the vehicle prior to braking can be deduced from the braking time, road conditions and the amount of damage to the vehicle.

In this example, it is contemplated that a shift register of a 32-bit length might be employed. The intervals between shifting pulses will be 0.5 seconds. Using these values, it can be seen that braking times of up to 16 seconds can be stored. This value is likely to be more than sufficient in that it can be attained only at very high vehicle velocities when the brakes are applied with full force. Obviously, by increasing the number of storage locations of the shift register, the measuring interval can be extended accordingly, or the resolution of the time measurement can be increased by shortening the clock pulse periods.

The primary function of battery 113 is as a reserve battery for protecting the contents of shift register 106. If, for any reason, the vehicle battery and power system should be defective, the reserve battery 113 will maintain the shift register contents.

Figure 2:
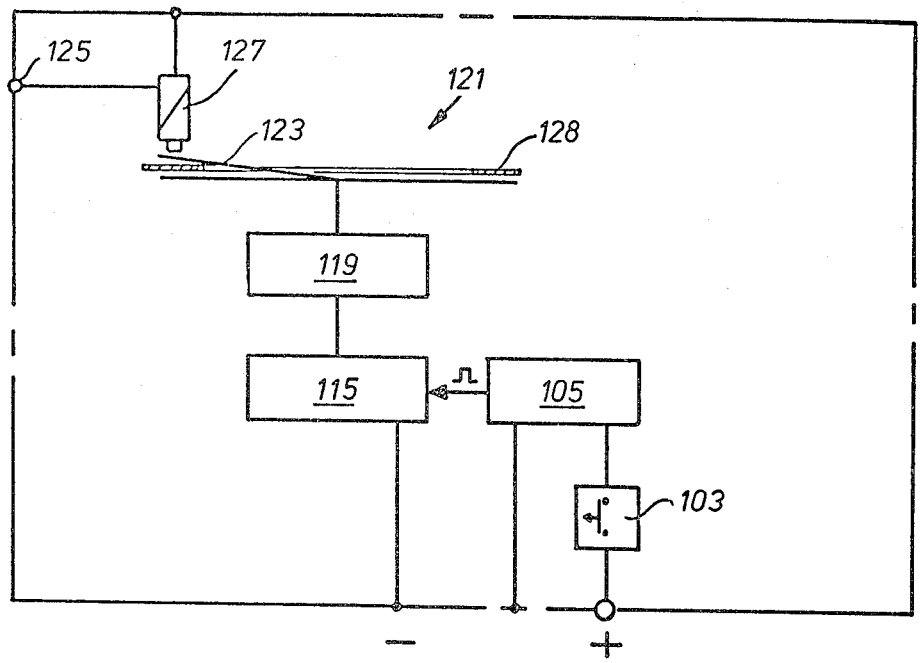
FIG. 2 is a schematic diagram of a second preferred embodiment constructed and operating according to the principles of the invention.

FIG. 2 is a schematic diagram of an alternative preferred embodiment which utilizes the principles of the FIG. 1 arrangement. In this case, however, an electromechanical form of shift register is used.

In this embodiment, an oscillator 105 which receives power through normally closed acceleration switch 103 drives a synchronous electric motor 115. In turn, motor 115 through a gear drive 119 drivingly rotates a disc 121.

Figure 3:
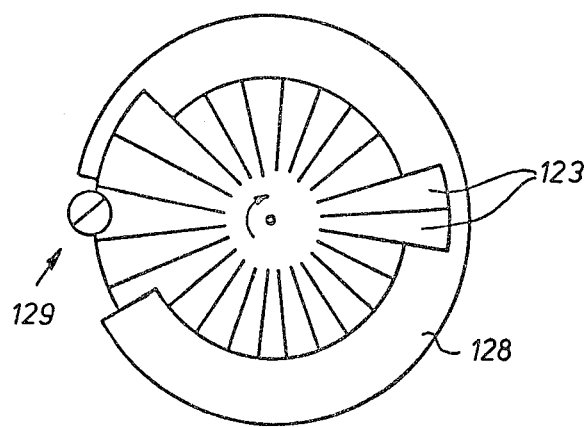
FIG. 3 is a plan view of an electromechanical shift register which may be used with the FIG. 2 embodiment.

As best shown in FIG. 3, circular disc 121 is divided into a plurality of sectors 123 which are, respectively, connected at the center of the disc. Each of the sectors 123 is a leaf spring-like device capable of being attracted at its outer end by an electromagnet 127. A stationary collar 128 is placed around disc 121 at its periphery, and this collar 128 includes a recess 129 adjacent electromagnet 127. Thus, the sections can be attracted only at the recess, and those sections which are attracted will rotate with the disc above the collar, while those sections which were not attracted by electromagnet 127 will remain below collar 128.

In normal operation, switch 103 will remain closed and oscillator 105 will energize synchronous motor 115 to operate gear drive 119 which, in turn, rotates the disc 121. If electromagnet 127 receives no electrical signal from stoplight switch 125, no one of the sectors 123 will be attracted toward electromagnet 127, and the disc 121 will continue to rotate in a single plane beneath the collar 128. During a braking action, electromagnet 127 will be energized by the stoplight switch and, upon energization, this electromagnet will attract the disc sections 123 passing therebelow at recess 129. If the brakes are simply subsequently released, the time between brake application and release will be indicated by the number of discs which were so attracted and which are now rotating above collar 128. Of course, those discs which pass under recess 129 during a time when the electromagnet was not energized will continue to rotate beneath collar 128.

In the event of an impact or the like, acceleration 103 will open to remove power from oscillator 105, and the operation of disc 121 will thereby be halted. Prior to that time, the brakes will have been applied, and the electromagnet 127 will have attracted a certain number of sectors 123 above a collar 128. Subsequently, the braking time prior to impact can be determined simply by counting the number of sections 123 on the top side of the collar. As an example, with a rotation of a disc 121 in 15 seconds and with a number of 30 sectors 123, there can be accommodated a sufficient braking time for the usual vehicle.

The embodiments of the invention described hereinabove are intended only to be examples of the principles of the invention. It is contemplated that the described embodiments can be modified or changed in a variety of ways known to those skilled in the art without departing from the spirit and scope of the invention as defined by the appended claims.

I claim:

1. Apparatus for measuring the time elapsed between application of a vehicle brake and occurrence of a predetermined event, comprising:

a shift register having a number of register locations, each of which is capable of assuming one of two binary states and having a means for receiving shift pulses which cause the contents of a given register location to shift to the next succeeding register location upon application of each shift pulse, oscillator means for supplying shift pulses to said means for receiving shift pulses in said shift register, brake signal generator means connected to a signal input of said shift register for changing the binary state of a first location in said shift register upon application of the vehicle brake, switch means operable responsive to a predetermined acceleration value experienced by said vehicle to disconnect said oscillator means from said means for receiving shift pulses, and interrogation terminal means for determining the number of locations in said shift register containing bits of changed binary state for providing a measure of time elapsed between application of the vehicle brake and occurrence of the predetermined event.

2. The apparatus defined in claim 1 wherein said shift register is an electronic digital shift register in which the different states of each register location are zero and one states.

3. The apparatus defined in claim 2 further comprising a reserve power source for maintaining the contents of said shift register.

4. The apparatus defined in claim 1 wherein said shift register is an electromechanical shift register.

5. The apparatus defined in claim 4 wherein said electromechanical shift register comprises a rotatable disc divided into a plurality of sectors, each said sector being movable from one plane to another, synchronous motor means for driving said rotatable disc, oscillator means for operating said synchronous motor means, switch means operable responsive to a given acceleration value for disconnecting said oscillator means from a source of power and means for moving said sectors from one plane to another operable responsive to said brake signal generator.

6. The apparatus defined in claim 5 wherein said disc sectors are made of a magnetizable material and wherein said means for moving is an electromagnet.

7. The apparatus defined in claim 6 wherein said brake signal generator means is a stoplight switch.

8. A method for measuring elapsed time between application of a vehicle brake and occurrence of a predetermined event, comprising the steps of:

supplying shift pulses to a shift register causing each individual bit to shift from its current register location to the next succeeding location in said shift register, interrupting the flow of shift pulses to said shift register upon occurrence of said predetermined event, changing the binary state of a first location in said shift register upon application of the vehicle brake and continuing to change the state of that location in said shift register so long as said vehicle brake is actuated, and interrogating said shift register to determine the number of locations containing a bit of changed binary state to provide an indication of the elapsed time between brake application and the predetermined event.

* * * * *